(12) United States Patent
LePori et al.

(10) Patent No.: US 11,779,159 B2
(45) Date of Patent: Oct. 10, 2023

(54) LOCKING BLADE BASE

(71) Applicant: Sunbeam Products, Inc., Boca Raton, FL (US)

(72) Inventors: Jeff LePori, Hattiesburg, MS (US); George Hardin, Hattiesburg, MS (US); Kristi Tyree, Beaumont, MS (US)

(73) Assignee: Sunbeam Products, Inc., Atlanta, GA (US)

( * ) Notice: Subject to any disclaimer, the term of this patent is extended or adjusted under 35 U.S.C. 154(b) by 208 days.

(21) Appl. No.: 16/924,515

(22) Filed: Jul. 9, 2020

(65) Prior Publication Data
US 2021/0007557 A1    Jan. 14, 2021

Related U.S. Application Data

(60) Provisional application No. 62/872,748, filed on Jul. 11, 2019.

(51) Int. Cl.
*A47J 43/07* (2006.01)
*B02C 18/18* (2006.01)

(52) U.S. Cl.
CPC ......... *A47J 43/0716* (2013.01); *A47J 43/075* (2013.01); *B02C 18/18* (2013.01)

(58) Field of Classification Search
CPC .. A47J 43/046; A47J 43/0716; A47J 43/0722; A47J 43/0761; A47J 43/0766
See application file for complete search history.

(56) References Cited

U.S. PATENT DOCUMENTS

| | | | | |
|---|---|---|---|---|
| 3,315,946 | A * | 4/1967 | Nissman | A47J 43/046 366/205 |
| 9,955,820 | B2 * | 5/2018 | Law | A47J 43/0716 |
| 2017/0340170 | A1 * | 11/2017 | Brunner | A47J 43/0727 |
| 2018/0008098 | A1 * | 1/2018 | Koscak | A47J 43/0716 |

FOREIGN PATENT DOCUMENTS

EP          2165632 B1 *  5/2012  .......... A47J 43/0716

* cited by examiner

*Primary Examiner* — Katrina M Stransky
*Assistant Examiner* — P Derek Pressley
(74) *Attorney, Agent, or Firm* — Husch Blackwell LLP

(57) ABSTRACT

A blender is provided that uses a latch handle to lock the blade base onto the jar member without the use of threads. When the latch is locked onto the jar member, the latch itself is engaged to a tab member protruding from the jar member in order to prevent the latch from opening on accident.

16 Claims, 7 Drawing Sheets

LOCKING BLADE BASE

CROSS-REFERENCE TO RELATED APPLICATIONS

This application claims priority to U.S. Provisional Patent Application Ser. No. 62/872,748, filed on Jul. 11, 2019, entitled "Locking Blade Base," currently pending, the entire disclosure of which is incorporated herein by reference.

FIELD OF INVENTION

The present invention relates generally to a blender for foodstuffs. More particularly, the present invention relates to a jar member and a blade base of a blender that may be locked to one another when the blender is in use but easily unlocked from one another for cleaning and maintenance.

BACKGROUND OF INVENTION

Blenders are used to blend foodstuffs ranging from smoothies and shakes to dips and sauces. Typically, blenders include ajar member in which the foodstuffs may be placed prior to blending, and a blade base that includes the blade that slices and blends the foodstuffs. In most blender appliances, the blade base is formed as a nut that can be screwed onto, and unscrewed from, threads on the jar member.

The jar member and the base may be separable from one another using the above-described screwing/unscrewing method so that each part is more easily cleanable after use. Most of the time, the blade base is easily screwed onto the jar member before use. However, after a blender is used either to blend hot or cold foods, the blade base can become very difficult to unscrew. The blade base may even get stuck to the jar member. In such a case, a tool may be required to unscrew the blade base from the jar member. Moreover, if the user does not screw the blade base onto the jar member sufficiently before use, the blender may leak or the jar member may come off during use.

SUMMARY OF THE INVENTION

The blender hereof uses a latching member that locks the blade base onto the jar member without the use of threads. When the latching member, which may be formed as a bale handle, is locked onto the jar member, the latching member itself is engaged to a tab member protruding from the jar member in order to prevent the latch from opening on accident.

The latching member is not only used for locking the jar member, but also for attaching and detaching the jar member. Since there are no threads, while the jar is blending, the blade base cannot spin and detach from the jar member during use. Since the blades and blade base are formed as one piece, the blender is easier and simpler to clean. The design may accommodate attachment to either of a glass jar or a plastic jar with a skirt.

DESCRIPTION OF THE DRAWINGS

For a better understanding of the various embodiments of the present invention, reference may be made to the accompanying drawings in which.

DETAILED DESCRIPTION OF THE INVENTION

In the following description, various embodiments of the present invention will be described. For purposes of explanation, specific configurations and details are set forth in order to provide a thorough understanding of the embodiments. It will also be apparent to one skilled in the art, however, that the present invention may be practiced without the specific details. Furthermore, well-known features may be omitted or simplified in order not to obscure the embodiment being described.

Figure 1:
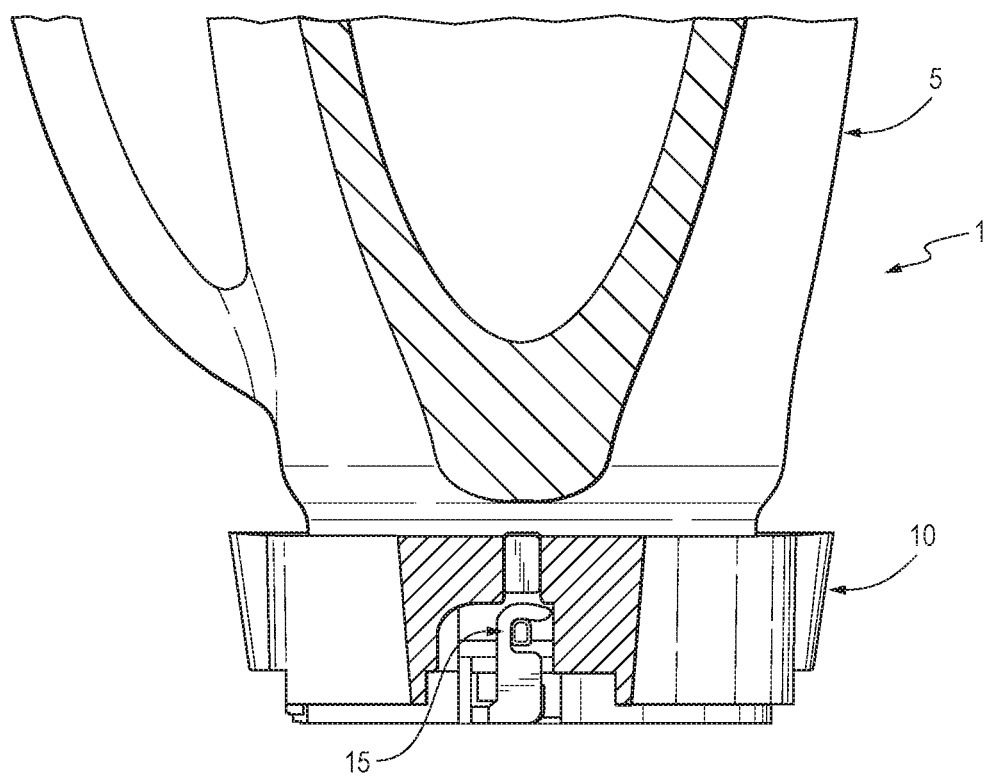
FIG. 1 is an elevation view of an example embodiment of a locking blade base in a locked position constructed according to the teachings of the present invention.

Referring now to the drawings, in which like reference numerals represent like parts throughout the several views, FIG. 1 illustrates a blender assembly 1 for blending various foodstuffs. The blender assembly 1 generally includes a jar member 5 where foodstuff may be placed prior to blending and in which food may be blended, a blade base 10 which may include blades for slicing and blending foodstuffs, and a latching member 15 that may be used to selectively engage and lock the jar member 5 and the blade base 10 to one another. The jar member 5 may be either plastic or glass (or other foreseeable materials) and may take on a variety of shapes and sizes that are known or foreseeable in the art.

Figure 2:
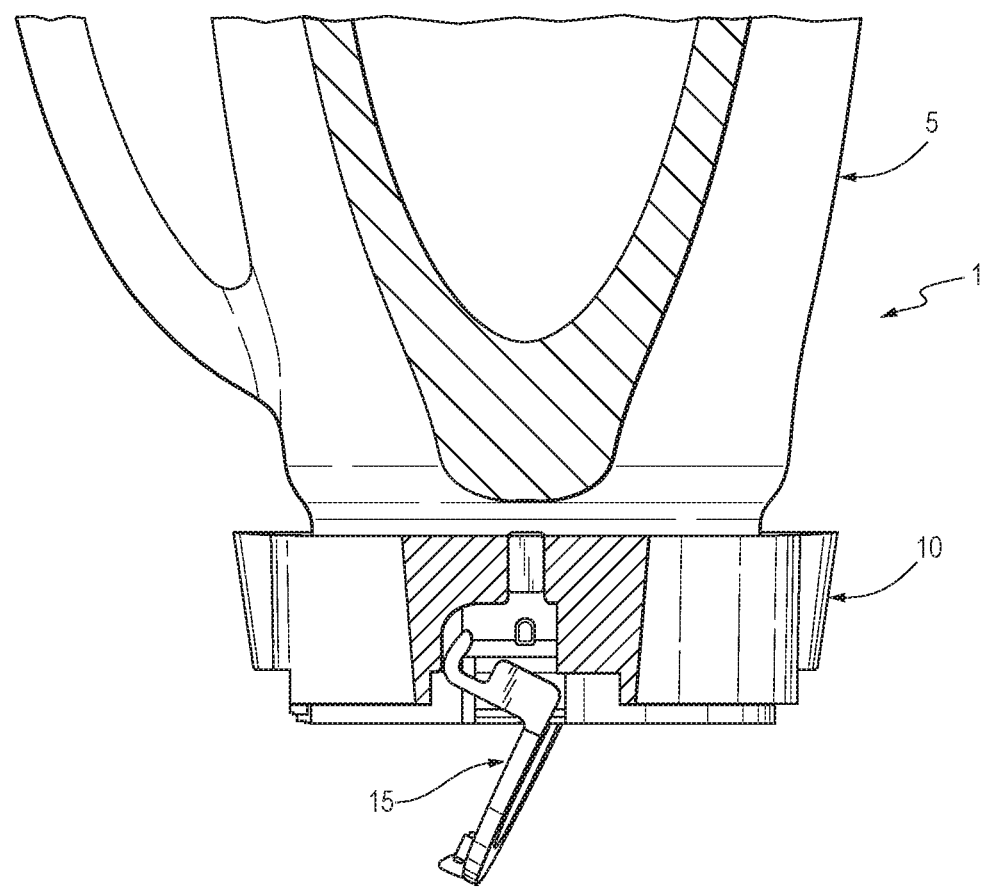
FIG. 2 is an elevation view of the locking blade base of FIG. 1 in a partially open position.
Figure 3:
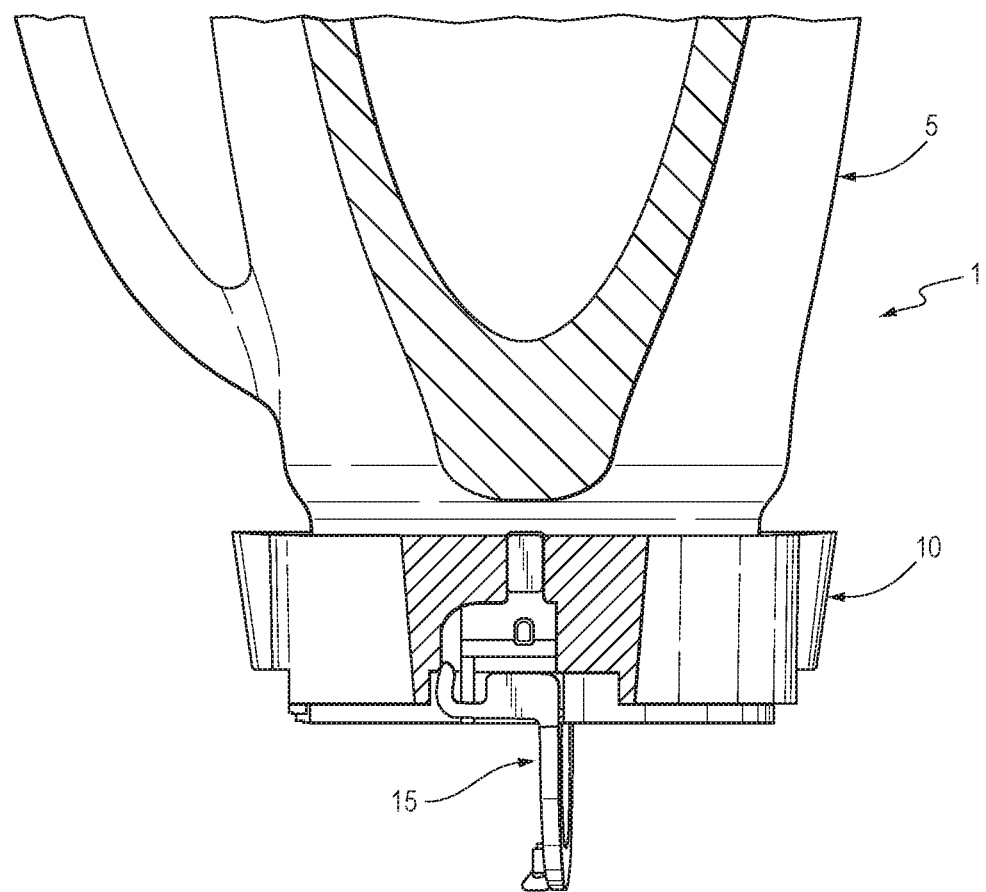
FIG. 3 is an elevation view of the locking blade base of FIGS. 1 and 2 in an open position.

In FIG. 1, the latching member 15 has been rotated completely upwardly so as to lockingly engage the jar member 5 and the blade base 10 to one another as described below. In FIG. 2, the latching member 15 has been rotated partially downwardly, thus unlocking the blade base 10 from the jar member 5 and making it disengageable therefrom. In FIG. 3, the latching member 15 has been rotated completely downwardly so that the blade base 10 is unlocked from the jar member 5 and can be disengaged from the jar member 5.

Figure 4:
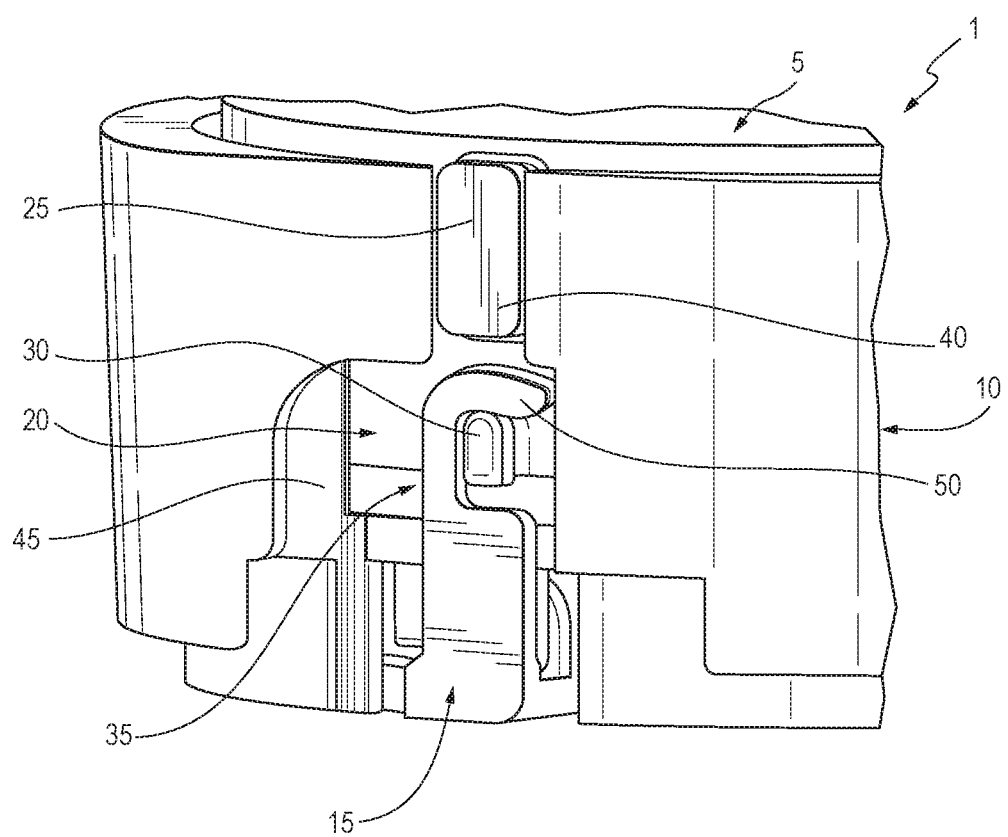
FIG. 4 is an enlarged view of the locking blade base of FIG. 1 in a locked position.

Turning now to FIG. 4, the latching member 15 is shown magnified in the completely closed position previously illustrated in FIG. 1. Near a lower portion 20 of the jar member 5, a first alignment tab member 25 may be provided that projects outwardly from the bottom portion 20 of the jar member 5. A second locking tab member 30 may also be provided below the alignment tab member 25 at the bottom portion 20 of the jar member 5. In FIG. 4, only one side of the jar member 5, blade base 10, and the latching member 15 is illustrated. However, as may be appreciated in the art, each of the aforementioned components are substantially symmetrical, and the other (unillustrated) side of the jar member 5, blade base 10 and latching member 15 appear substantially the same as the sides illustrated in FIG. 4.

As provided in FIG. 4, the blade base 10 includes a channel member 35 that extends upwardly along the length of the blade base 10. The channel member 35 preferably has a first channel portion 40 that is of a width to accommodate each of the tab members 25, 30. More particularly, the channel member 40 has a width just greater than that of the alignment tab member 25 such that when the jar member 5 is pushed downwardly into the blade base 10, the tab member 25 may be snuggly and securely retained within the first portion 40 of the channel member 35. A second portion 45 of the channel member 35 preferably is wider than the first portion 40. More particularly, the second portion 45 is sufficiently wide to allow for an upper hook portion 50 of the latching member 15 to rotate within the second portion 45 in the manner illustrated in FIGS. 1-3.

When the latching member 15 is rotated to its completely closed and locked position (as illustrated in FIGS. 1 and 4), the hook member 50 of the latching member 15 lockingly engages the tab member 30. When the hook member 50 of latching member 15 has engaged the locking tab member 30 of the jar member 5, the latching member 15 preferably operates to lockingly engage the blade base 10 and the jar member 5 to one another. In this position, if one were to pull downwardly on the blade base 10 in an effort to pull the blade base 10 from the jar member 5, the blade base 10 and the jar member 5 would remain engaged to one another.

To unlock and disengage the jar member 5 from the blade base 10, a user may rotate the latching member 15 in the manner illustrated in FIGS. 2 and 3 (rotating the latching member 15 downwardly) to disengage the hook member 50 from the tab member 30. Then, the jar member 5 may be pulled upwardly, and the first tab member 25 may be slidingly disengaged from the first portion 40 of the channel member 35 within the blade base 10. It should be noted that when the latching member 15 is rotated downwardly, both the illustrated hook member 50 and the hook member (not illustrated) opposite from the hook member 50 may be disengaged from the illustrated tab member 30 and the tab member (not illustrated) opposite from the tab member 30.

Figure 5:
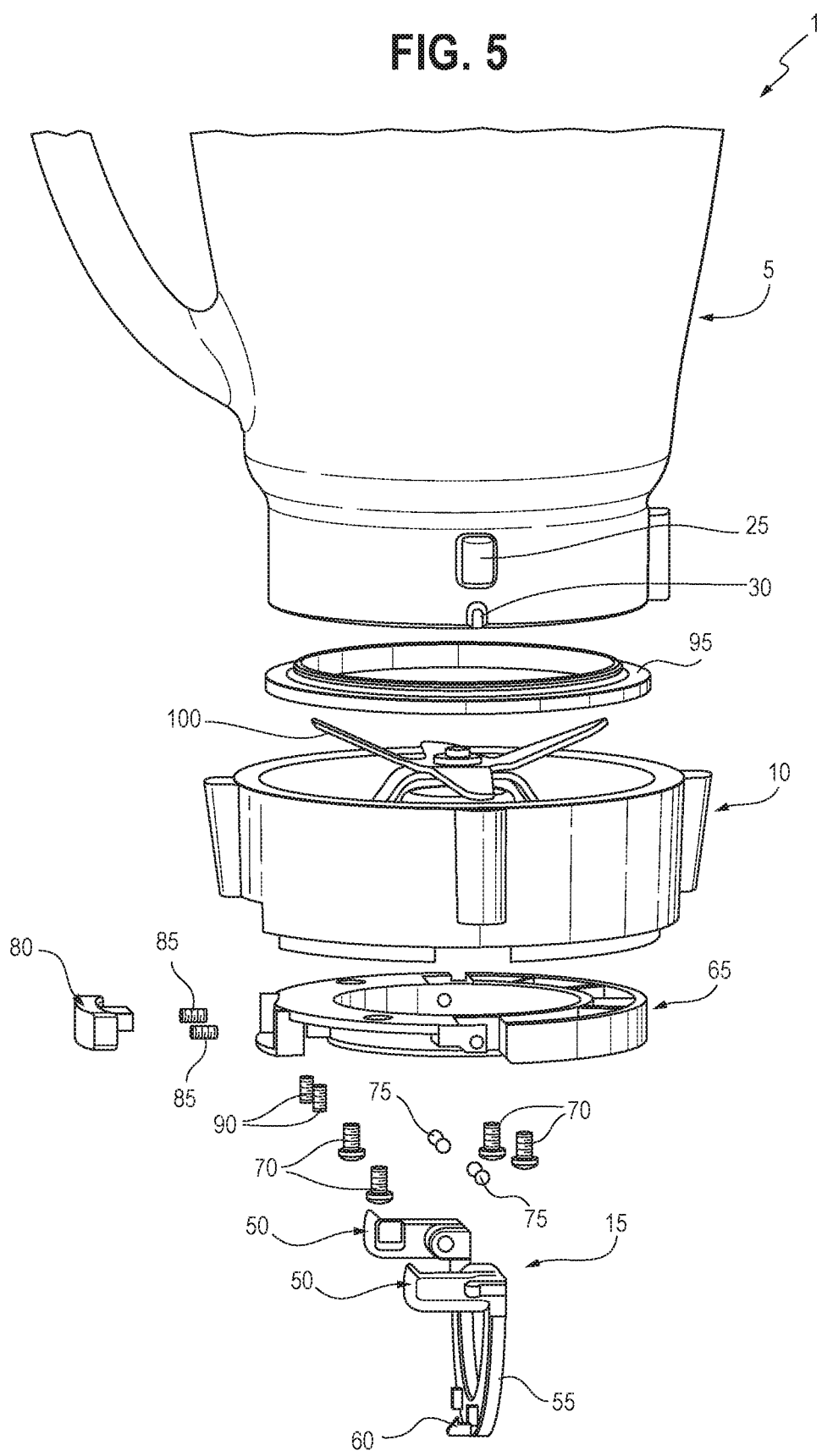
FIG. 5 is an exploded view of the locking blade base of FIGS. 1-4.

Turning to FIG. 5, the various components that make up the blender apparatus 1 are exploded from one another to better illustrate how they fit and interact with one another. Turning first to the latching member 15, the hook members 50 previously described that engaged the second tab member 30 of the jar member 5 are illustrated in greater detail. In addition to the hook members 50, the latching member 15 preferably includes an arcuate grippable handle 55 as well as two barbed locking members 60, the function of which is described in greater detail herein below. The latching member 15 is preferably attachable to a latching interface member 65 that is further engageable with the blade base 10. In a preferred embodiment, and as illustrated, the latching member 15 may be attached to the interface member 65 by a plurality of screws 70 and pivot handle pins 75 in a known manner.

A lock and release button 80 is also preferably provided that may be engaged with the interface member 65. As will be described below, the locking and release button 80 may be depressed to release the barbed locking members 60 from the blade base 10 when desired by a user. Locking and release button springs 85 may also be provided to spring the locking and release button 80 when utilized. Further, open assist springs 90 may be provided that aid in opening and pivoting the latching member 15.

A jar seal member 95 is preferably provided that may be releasably engageable with the jar member 5. When the jar member 5 and the blade base 10 are engaged with one another in the manner described above, the jar seal member 95 may provide a seal that prevents food stuffs and blended food stuffs from escaping from the jar member 5 after blender. FIG. 5 also illustrates blade members 100 that may be associated with the blade base 10 and used in a manner commonly known and understood in the art to slice and blend foodstuffs.

Figure 6:
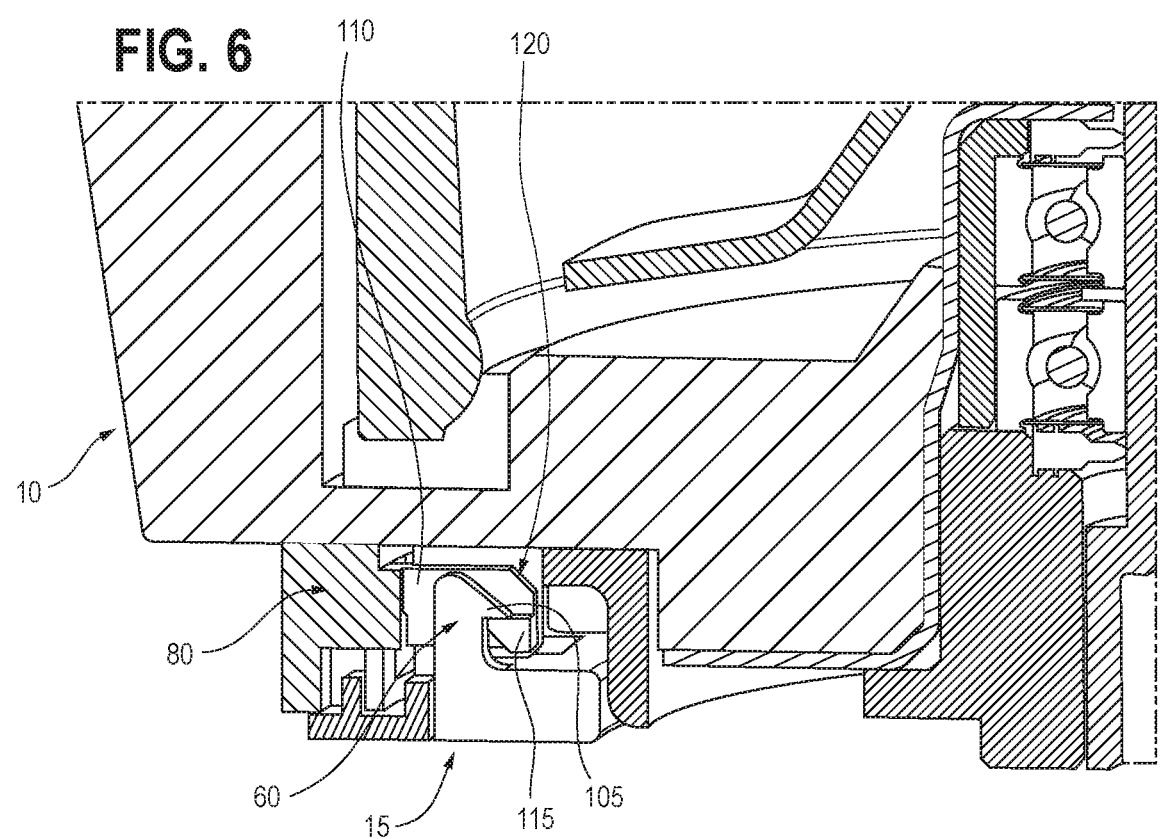
FIG. 6 is a cross-section view of the blade base of FIG. 1 in a locked position.
Figure 7:
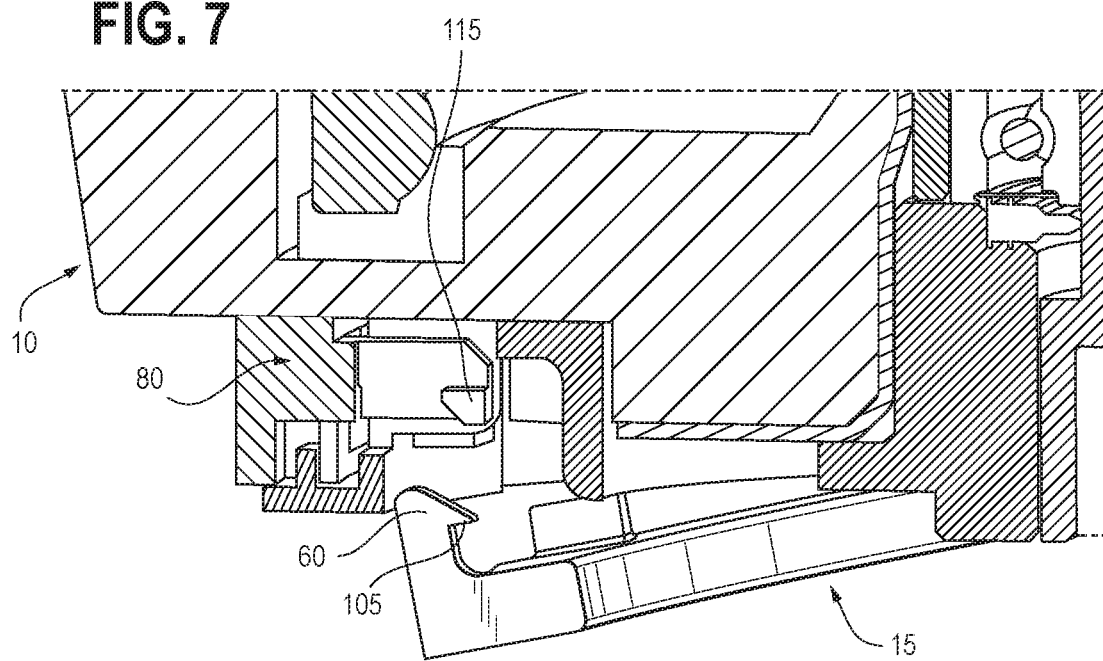
FIG. 7 is a cross-section view of the blade base of FIG. 2 in a partially open position.
Figure 8:
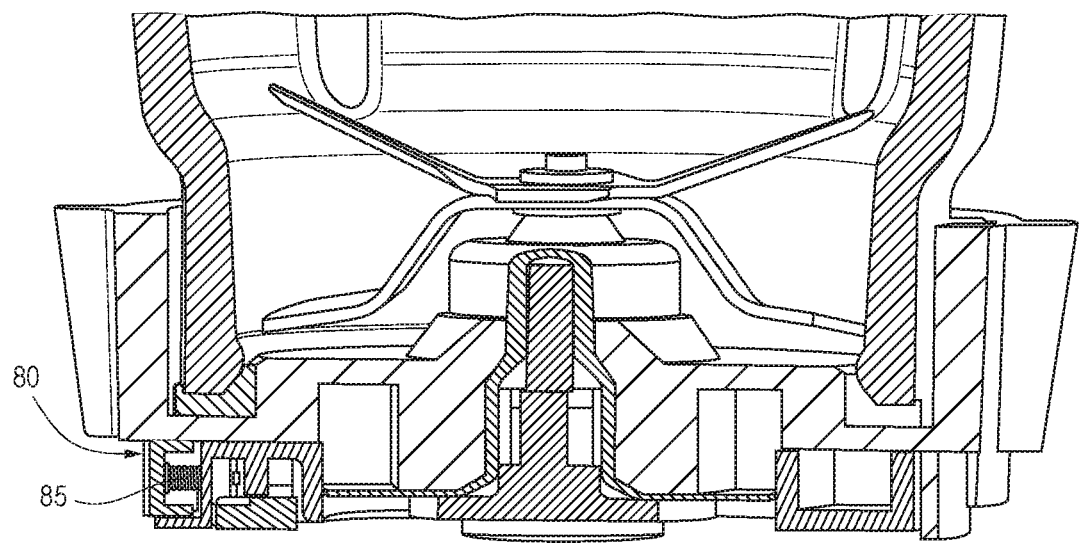
FIG. 8 is a first alternative cross-section view of the blade base of FIG. 1 in a locked position.
Figure 9:
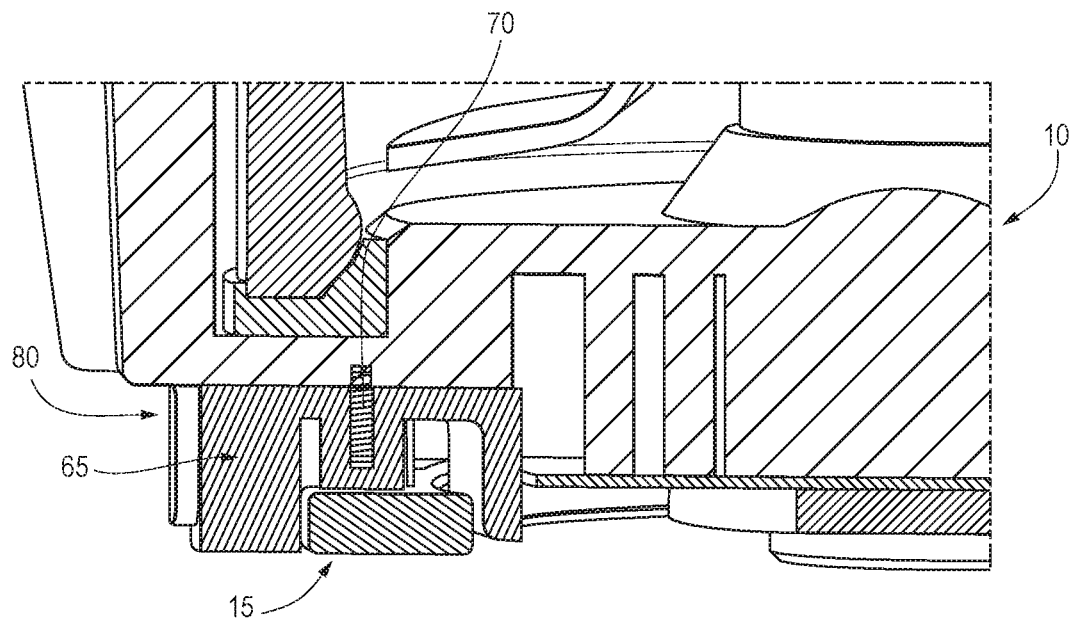
FIG. 9 is a first alternative cross-section view of the blade base of FIG. 1 in a locked position; and While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

FIGS. 6 and 7 illustrate the interaction between the locking and release button 80 and the latching member 15 and more particularly its barbed locking members 60. In FIG. 6, the latching member 15 has been rotated such that it is completely closed, and the blade base 10 and the jar member 5 are lockingly engaged with one another in the manner described above in reference to FIG. 4. As shown in FIG. 6, in this closed, locked, engaged position, a pointed barb 105 of the barbed locking member 60 is retained within a cavity 110 of the button 80 and is abutting a ledge member 115 found therein. The ledge member 115 is preferably formed on a rear portion 120 of the button member 80.

In FIG. 7, the button 80 has been depressed, thus pushing the ledge member 115 rearwardly. When the ledge member 115 is pushed rearwardly, the barb 105 of the barbed locking member 60 may be freed from the ledge member 115. This allows the latching member 15 to now move freely and be opened in the manner illustrated in FIGS. 2 and 3 to eventually release the blade base 10 from the jar member 5.

Opening and closing the latching member 15 to lock and unlock the latching member 15 in place relative to the locking and release button 80 may be facilitated by the springs 85 and 70. More particularly, the locking and release springs 85 that are provided in the locking and release button 80 may operate not only to provide a resistance when the button 80 is compressed, but also provides some compression when the latching member 15 is closed and the barb 105 rampingly slides along the ledge member 115. Because of the compression that the spring 85 provides, when the latching member 15 is closed, the barb 105 may press against the ledge 115 until it slides past and is locked into place. At that time, the spring 85 may provide an outward force that keeps the ledge member 115 and the barb 105 of the hook member 60 engaged to one another.

On the other hand, assist springs 70 are preferably provided between the blade base 10 and the interface member 65. When the button 80 is depressed, the springs 70 preferably provide a downward force that acts on the latching member 15. Upon releasing the latching member 15 in the manner described above, the springs 70 may exert a downward force that causes the latching member 15 to springingly open in the manner illustrated in FIGS. 2 and 3.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required."

Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A locking blade base for engaging and locking a jar member and the blade base to one another, the locking blade base comprising:
    a latching member that includes a hook member, wherein in a first position the hook member engages and abuts a locking tab member of the jar member to lock the blade base to the jar member,
    wherein in a second position the hook member does not engage and does not abut the locking tab member of the jar member, and the jar member and the blade base are not lockingly engaged to one another,
    wherein the hook member has an axis of rotation below the locking tab member;
    wherein the blade base includes a lock and release button that is depressable to release the hook member from the locking tab member; and
    wherein the lock and release button includes a ledge member at a rear portion thereof.

2. The blade base of claim 1, wherein an alignment tab member is provided on the jar member above the locking tab member substantially in alignment with the locking tab member.

3. The blade base of claim 1, wherein the blade base includes a channel member that extends upwardly along a length of the blade base and through which the locking tab member may fit.

4. The blade base of claim 1, wherein the latching member includes a barbed locking member that engages the ledge member in the first position.

5. The blade base of claim 1, wherein blade base includes a blade set.

6. The blade base of claim 1, wherein the blade base includes a seal member that provides a seal between the blade base and the jar member.

7. The blade base of claim 1, wherein lock and release button is spring-loaded.

8. The blade base of claim 1, wherein the latching member includes a second hook member, and the jar member includes a second locking tab member.

9. A locking blade base for engaging and locking a jar member and the blade base to one another, the locking blade base comprising:
    a latching member that includes a hook member, wherein the hook member includes an opening on at least one edge thereof;
    a locking tab member positioned and located on the jar member and configured to be received within the opening of the hook member, wherein in hook member has an axis of rotation below the locking tab member;
    wherein the hook member is selectively engageable with the locking tab member to lock the blade base to the jar member;
    wherein the blade base includes a lock and release button that is depressable to release the hook member from the locking tab member; and
    wherein the lock and release button includes a ledge member at a rear portion thereof.

10. The blade base of claim 9, wherein an alignment tab member is provided on the jar member above the locking tab member substantially in alignment with the locking tab member.

11. The blade base of claim 9, wherein the blade base includes a channel member that extends upwardly along a length of the blade base and through which the locking tab member may fit.

12. The blade base of claim 9, wherein the latching member includes a barbed locking member that engages the ledge member when the blade base is locked to the jar member.

13. The blade base of claim 9, wherein blade base includes a blade set.

14. The blade base of claim 9, wherein the blade base includes a seal member that provides a seal between the blade base and the jar member.

15. The blade base of claim 9, wherein lock and release button is spring-loaded.

16. The blade base of claim 9, wherein the latching member includes a second hook member, and the jar member includes a second locking tab member.

* * * * *

UNITED STATES PATENT AND TRADEMARK OFFICE
CERTIFICATE OF CORRECTION

| | | |
|---|---|---|
| PATENT NO. | : 11,779,159 B2 | |
| APPLICATION NO. | : 16/924515 | |
| DATED | : October 10, 2023 | |
| INVENTOR(S) | : Jeff LePori, George Hardin and Kristi Tyree | |

It is certified that error appears in the above-identified patent and that said Letters Patent is hereby corrected as shown below:

In the Specification

Column 1, Line 24, delete "ajar" and replace with -- a jar --

Signed and Sealed this
Thirteenth Day of February, 2024

Katherine Kelly Vidal
*Director of the United States Patent and Trademark Office*